Aug. 3, 1965    P. K. OGAWA    3,198,309
TRANSFER APPARATUS
Filed Feb. 14, 1963    3 Sheets-Sheet 2

INVENTOR.
PAUL K. OGAWA
BY
ATTORNEYS 3,198,309
TRANSFER APPARATUS
Paul K. Ogawa, Saginaw, Mich., assignor to Baker Perkins Inc., Saginaw, Mich., a corporation of New York
Filed Feb. 14, 1963, Ser. No. 258,518
8 Claims. (Cl. 198—24)

This invention relates to transfer apparatus and methods especially adapted for use with bakery products, and more particularly the invention relates to apparatus and methods for unloading flanged articles, such as pie tins, from a first station, such as an oven, and transferring them to a second station, such as a movable conveyor.

Modern bakeries produce a large number of baked goods such as pies, cakes, and the like in aluminum or other metal foil tins or trays. Such tins may be round, square, or rectangular and form part of the package containing the baked product. The tins are intended to be thrown away or otherwise disposed of by the consumer and, to maintain the cost of the tins as low as possible, the material from which they are made is extremely thin. Thin walled tins are quite fragile and must be handled extremely carefully in the baking and material handling operations in order to avoid piercing or tearing of the tins and consequent rejection and waste of the baked product.

Most, if not all, metal foil tins are provided with a marginal rib or flange adjacent their upper ends to lend rigidity to the tins and to facilitate their stacking prior to use. When such a tin contains a baked product, the product itself reinforces the side walls of the tin, thereby permitting the tin to be supported by its marginal flange. Apparatus constructed in accordance with the invention utilizes this characteristic of metal foil tins in the transfer and handling of such tins.

In the baking of pies, it frequently occurs that some of the juices spill over the tins, thereby rendering the tins sticky. The handling of sticky tins poses special problems in the use of automatic machinery, since all tins must be made to move uniformly along the line of machinery.

An object of this invention is to provide transfer apparatus that is especially adapted for use in the handling of thin walled, metal foil tins having marginal flanges at their upper ends.

Another object of the invention is to provide transfer apparatus that is operable on tins of different shapes.

A further object of the invention is to provide transfer apparatus which is operable automatically to transfer fragile tins from one position to another without risking injury to the tins or to the products contained therein.

Another object of the invention is to provide transfer apparatus of the character described that is operable in timed relation to other automated mechanisms and without interfering with the operation of such other mechanisms.

A further object of the invention is to provide an improved method of transferring baked goods or other articles from one station to another.

A still further object of the invention is to provide apparatus especially adapted to assure smooth transfer of all tins, sticky or otherwise, from one station to another.

Other objects and advantages of the invention will be pointed out specifically or will become apparent from the following description when it is considered in conjunction with the appended claims and the accompanying drawings, in which:

Figure 1:
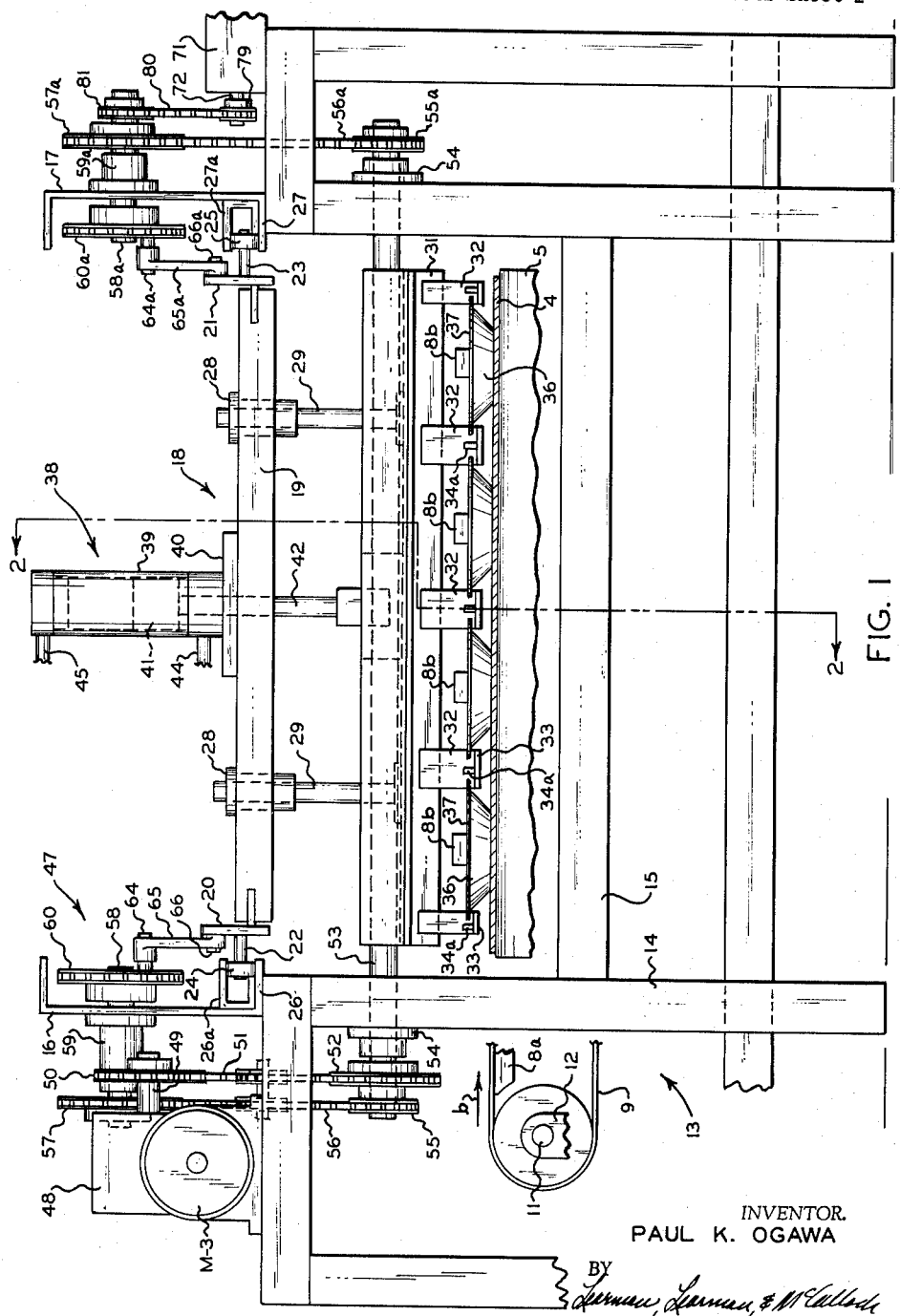
FIGURE 1 is a view partly in section and partly in end elevation of transfer apparatus constructed in accordance with the invention and interposed between a delivery conveyor and a receiving conveyor.

Apparatus constructed in accordance with the invention is adapted to be interposed between a delivery conveyor or support 1 and a receiving conveyor or support 2 so as to transfer articles from the conveyor 1 to the conveyor 2. The conveyor 1 may be the unloading conveyor of an oven and comprises an endless belt 4 that is trained around a turning drum or sprocket 5 having an axle 6 journaled for rotation in suitable supports 7. Mounted in a conventional manner on a framework (not shown) below the upper run of the belt 4 is a support 8 which prevents sagging of the conveyor under the weight of pie or the like tins 3. The conveyor 4 has its upper run continuously driven in the direction of the arrow $a$ by suitable means such as an electric motor M–1.

The receiving conveyor 2 comprises an endless belt 9 trained around a turning roll 10 having an axle 11 that is journaled for rotation in a suitable support 12. The conveyor 2 is driven intermittently by an electric motor M–2 in such direction as to cause its upper run to move in the direction of the arrow $b$ (FIGURE 1). Preferably, the upper or supporting runs of the conveyors 1 and 2 are located at the same level, but uniformity of height of the conveyors 1 and 2 is not essential to the operation of the transfer apparatus. The upper run of the receiving conveyor belt 9 rides upon a support 8a, similar to the support 8, and at the side of the support 8a remote from the unloading conveyor are bolted or otherwise secured spaced apart abutments or fingers 8b that partially overlie and extend above the upper run of the conveyor for a purpose presently to be explained.

Transfer apparatus constructed in accordance with the invention is designated generally by the reference character 13 and includes a supporting framework composed of vertical frame members 14 interconnected with one another by horizontal frame members 15, the frame members being riveted, bolted, welded, or otherwise suitably secured one to another to provide a rigid structure. Mounted atop the supporting frame is a pair of channel members 16 and 17 between which is mounted a tin supporting and transfer carriage assembly designated generally by the reference character 18.

The carriage assembly 18 comprises a bar 19 extending transversely of the direction of movement of the upper run of the delivery conveyor 1 and having a pair of upstanding plates 20 and 21 at opposite ends thereof from which extend stub shafts 22 and 23, respectively. Journaled on the shafts 22 are guide rollers 24, and similar rollers 25 are journaled on the shafts 23. The rollers 24 are received between horizontal guide flanges 26, 26a, the flange 26 preferably comprising one of the flanges of the channel member 16. The rollers 25 similarly are received between horizontal guide flanges 27, 27a, the two sets of guide flanges serving to mount and guide the carriage 18 for reciprocating movements along a horizontal path from the discharge end of the conveyor 1 toward and beyond the receiving conveyor 2, and return.

The bar 19 is apertured at intervals along its length to accommodate bushings 28 in each of which is slidably mounted a rod 29. The lower end of each rod 29 is bolted, welded, or otherwise suitably fixed to a transversely extending, generally Z-shaped support member 30 having a depending flange 31 to which may be welded or otherwise fixed a plurality of fork blades or tines 32. Each of the tines 32 includes a generally horizontal section 33 and the tines are spaced apart from one another such a distance as to permit a tin 3 to be received between each pair of tines. The leading ends of the tines 33 may be tapered as at 34 and equipped with upstanding guide pins 34a to guide misaligned tins between the tines.

Figure 3:
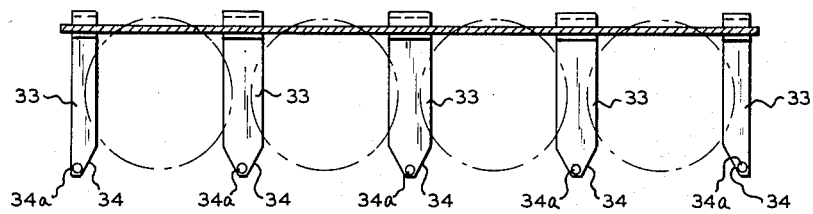
FIGURE 3 is an enlarged, sectional view taken on the line 3—3 of FIGURE 2.

Each of the tins 3 has a bottom 35 that rests upon the surface of the conveyor belt 4 and an upstanding side wall 36 terminating at its upper end in an outwardly directed flange 37. As is illustrated in FIGURES 1 and 3, the spacing between the tines 32 is less than the diameter of the flange 37 so that when a tin is between two adjacent tines upward movement of the supporting member 31 will cause the tin to be lifted clear of the surface of the conveyor belt 4.

Operating means 38 is provided for lifting and lowering the supporting means 18 and comprises a fluid cylinder 39 having a mounting flange 40 that is bolted or otherwise fixed to the carriage member 19 and within which is mounted a reciprocable piston 41. To the piston 41 is connected one end of a piston rod 42 that extends through an opening in the member 19 and has its other end connected to a bracket 43 that is fixed to the member 30. Compressed air or hydraulic fluid may be introduced to one end of the cylinder through a tube 44 under the control of an actuating mechanism yet to be described to effect lifting of the tines 33, and pressure fluid may be introduced to the cylinder 39 through a tube 45 to effect lowering of the tines.

Means 47 is provided for driving the tin supporting apparatus along its path of travel and comprises a driving motor M-3 that is mounted on the supporting framework and coupled to a speed reduction unit 48 of known construction having a driven shaft 49 on which is fixed a sprocket wheel 50. Trained around the sprocket wheel 50 is a drive chain 51 that also is trained around a sprocket wheel 52 which is fixed adjacent one end of a shaft 53 that spans the width of the transfer mechanism and is journaled adjacent its opposite ends in bearings 54 that are fixed to selected frame members 14.

At one end of the shaft 53 is a sprocket wheel 55 around which is trained a chain 56, the chain also being trained around a sprocket wheel 57 that is fast on a shaft 58 journaled in bearings 59 supported on the channel member 16. Also fixed on the shaft 58 is a sprocket wheel 60. A companion sprocket wheel 61 is mounted on a shaft 62 that also is journaled on the channel member 16, and around the sprocket wheels 60 and 61 is trained an endless chain 63. Secured to one of the links of the chain 63 is a laterally projecting post 64 to which is pivoted one end of a link 65. The opposite end of the link 65 is pivoted on a post 66 carried by the plate 20.

The driving mechanism includes apparatus at the opposite side of the machine similar to that just described, and similar parts are designated by similar reference characters, followed by the suffix a.

Figure 2:
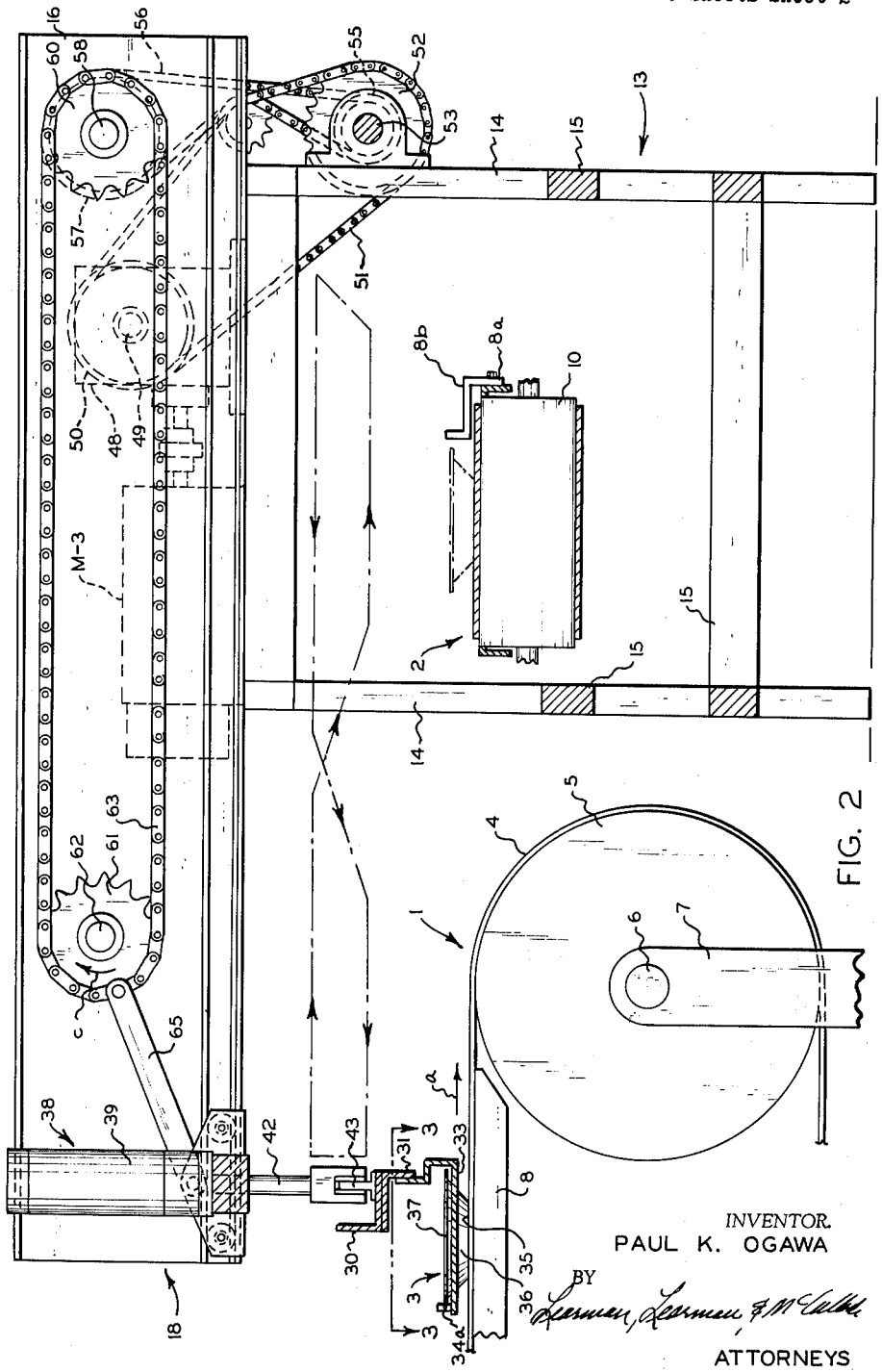
FIGURE 2 is a transverse sectional view taken on the line 2—2 of FIGURE 1.

The construction of the drive mechanism is such that, upon operation of the motor M-3, the chains 63, 63a are driven in the direction of the arrow c (FIGURE 2) so as to effect reciprocation of the carriage assembly 18 along a substantially horizontal path defined by the guide members 26, 26a and 27, 27a. The length of travel or, stated differently, the stroke of the carriage assembly is such that, at one extreme, the tines 33 will be positioned above and adjacent the discharge end of the conveyor 1, as is indicated in FIGURE 2. At the other extreme, the tines 33 will be located in a position to the right of and beyond the conveyor 2, as viewed in FIGURE 2.

To effect transfer of tins from the delivery conveyor 1 to the receiving conveyor 2, it is preferred to lift the tins vertically off the conveyor 1, move the tins toward the conveyor 2 and lower the tins in such manner as to deposit them substantially at the longitudinal center of the conveyor. This operation, therefore, requires lowering of the tines to the conveyor 2 and preferably, the tines 33 are lowered to a position free of the tin flange 37 during movement of the tines across the conveyor 2 so as to disengage the tines from the tins and to remove the tins from between the tines. The upstanding fingers 8b are so spaced from one another as to permit the tines to pass between them without interference. Should there be any tendency of a sticky tin to adhere to the tines, passage of the latter between the fingers 8b will cause the sticky tin to engage a finger and be stripped from the tines so as to be deposited on the receiving conveyor in substantial alignment with the other tins.

After the tines have been moved clear of the tins, it is preferred that the tines be lifted to a level above the tins so as to permit movement of the tines across the conveyor 2, toward the conveyor 1, without risking interference between the tines and the tins previously deposited on the conveyor 2. When the return movement of the tines has progressed to a point where the tines are between the conveyors 1 and 2, the tines preferably are lowered to a position below the level of the flanges 37 so as to enable the tines to be located in a position to receive other tins therebetween in preparation for transfer. From the foregoing, it will be apparent that the movement of the tines describes a path that is of substantially figure 8 configuration. This path is shown in chain lines in FIGURE 2.

Actuating means 70 (FIGURE 4) is provided to effect operation of the operating means 38 in accordance with the foregoing and comprises a housing 71 mounted on the supporting framework and in which is journaled a rotatable shaft 72 on which is mounted a plurality of cams 73-76, each of which is in operative association with a switch. The shaft 72 is driven by the motor M-3 and is provided with a sprocket wheel 79 around which is trained a drive chain 80, the chain also being trained around a sprocket wheel 81 that is mounted on the shaft 58a.

Figure 4:
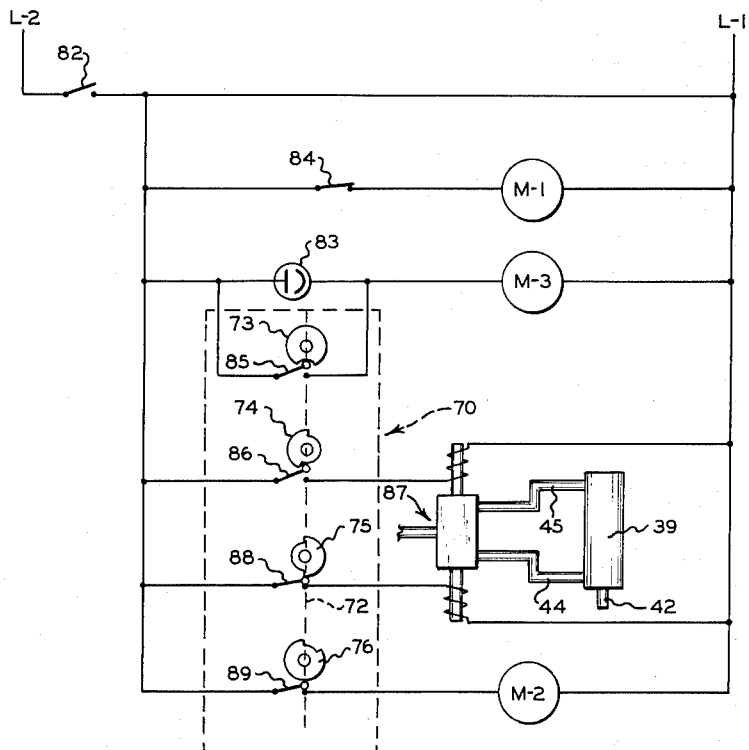
FIGURE 4 is a schematic diagram of simplified means for actuating the transfer apparatus.

The operation of the actuating mechanism will be described with reference to FIGURE 4, which discloses the components in the positions they occupy when the apparatus is in the condition shown in FIGURE 2.

A pair of power lines L-1 and L-2 are connected to a suitable source of electric energy, and the apparatus may be conditioned for operation by closing a start-stop switch 82. Upon closing of a switch 84, the motor M-1 will drive the conveyor 1 to deliver a set of tins 3 to the discharge end of the conveyor, whereupon the tins will block a light beam associated with a photoelectric cell 83 and start the motor M-3. Operation of the motor M-3 will drive the shafts 59, 59a to begin operation of the carriage assembly 18, and also will drive the shaft 72 to initiate rotation of the cams 73-76.

Starting of the motor M-3 will cause the carriage to move slightly toward the conveyor 1 to assure reception of the tins between the tines, but such movement is relatively short inasmuch as initial movement of the links 65, 65a causes them to begin to move upwardly from the lower runs of the chains 63, 63a to the upper runs. Simultaneously with the initial movement of the carriage, the cam shaft 72 begins to rotate and the cam 73 closes a normally open switch 85 bridging the photocell, so as to enable energy to be supplied to the motor M-3 upon raising of the tins 3. Rotation of the cam shaft also causes the cam 74 simultaneously to close a switch 86 leading to a solenoid actuated valve 87 of known construction and which is operable, when actuated by the closing of the switch 86, to conduct pressure fluid from a source (not shown) to the cylinder 39 via the tube 44 and effect lifting of the tines 33 and the tins 3. Thus, the tines initially move toward the conveyor 1 and upwardly an amount sufficient to lift the tins off the unloading conveyor. Following elevation of the tines, the motor M-3 drives the carriage assembly laterally toward the conveyor 2.

At a point between the conveyors 1 and 2 the cam 74 releases the switch 86, thereby deenergizing the associated solenoid. At about the same time, the cam shaft will have rotated an amount sufficient to cause the cam 75 to close a switch 88 and energize the solenoid actuated valve 87 which acts to introduce pressure fluid to the cylinder 39 via the tube 45 and lower the tines and tins. During lowering movement of the tines, the carriage continues to move away from the conveyor 1. By the time the tins have been lowered an amount to engage the conveyor 2, the carriage will have been moved to a position to locate the tins at about the longitudinal center of the belt 9, and the cam 76 will have opened a switch 89 to interrupt operation of the motor M-2, and temporarily stop the conveyor 2.

After engagement of the tins and the conveyor belt 9, the tines continue to move downwardly a short distance, to effect disengagement between the tines and the flanges of the tins. The carriage continues to move to the right, as viewed in FIGURE 2, to locate the tines in a position beyond the tins so as to withdraw the latter completely from between the tines, this operation being assured by the stripping fingers 8b.

At the time the tins are withdrawn from the tines, the cam 76 will be rotated by the cam shaft an amount sufficient to close the switch 89, whereupon the motor M-2 again drives the conveyor 2 and the tins supported thereon. Furthermore, the cams 74 and 75 at this time will have been moved to positions to open the switch 86 and close the switch 88, respectively, to energize the solenoid of the valve 87 and cause the tines to be lifted to a height above the level of the tins on the conveyor 2.

By the time the tines are elevated, the carriage drive links 65, 65a will have moved from the upper runs of the drive chains to the lower runs, and the carriage assembly will be driven toward the conveyor 1. Between the conveyors 1 and 2, the cams 74 and 75 will effect opening of the switch 86 and closing of the switch 88 associated with the valve mechanism 87 to cause the tines to be lowered to their initial position below the level of the tin flanges 37.

The return movement of the carriage continues until the cam 73 permits the switch 85 to open, thereby stopping the carriage with the tines in position to receive an additional set of tins, unless the photocell circuit is held closed by a set of tins on the conveyor 1. The cycle of operation then is repetitive.

Although the description of the apparatus has been concerned primarily with the transfer of pie and similar tins, it should be understood that the apparatus is equally adapted for use with cake, roll, and other kinds of tins of different shapes. This disclosure, therefore, is intended to be illustrative rather than definitive of the invention. The invention is defined in the claims.

What is claimed is:

1. Apparatus for transferring an article from a first position to a second position, said apparatus comprising carriage means; at least one pair of substantially parallel supporting members free at corresponding ends carried by said carriage means and spaced apart from one another a distance to engage and support said article; means for lifting said carriage means at said first position to effect lifting of said article; means for transferring said carriage means in a direction from said first position toward said second position and beyond; means at said second position located between said support members for engaging said article and removing the latter from said support members as said carriage means is transferred in said direction beyond said second position; and means for returning said carriage means to said first position.

2. Apparatus for transferring an article from a first position to a second position, said apparatus comprising carriage means; at least one pair of substantially parallel supporting members free at corresponding ends carried by said carriage means and spaced apart from one another a distance to engage and support said article; means for lifting said carriage means at said first position to effect lifting of said article; means for transferring said carriage means in a direction from said first position toward said second position and beyond; means for lowering said carriage means at said second position; means at said second position located between said support members for engaging said article and removing the latter from said support members as said carriage means is transferred in said direction beyond said second position; and means for returning said carriage means to said first position.

3. Apparatus for transferring an article from a first position to a second position, said apparatus comprising carriage means; at least one pair of substantially parallel supporting members free at corresponding ends carried by said carriage means and spaced apart from one another a distance to engage and support said article; means for lifting said carriage means at said first position to effect lifting of said article; means for transferring said carriage means in a direction from said first position toward said second position and beyond; means for lowering said carriage means at said second position to an article support structure; means at said second position located between said support members for engaging said article and removing the latter from said support members as said carriage means is transferred in said direction beyond said second position; means for raising said carriage means when the latter has been transferred beyond said second position; and means for returning said carriage means to said first position.

4. Apparatus for transferring an article from a first position to a second position, said apparatus comprising carriage means; at least one pair of substantially parallel supporting members free at corresponding ends carried by said carriage means and spaced apart from one another a distance to engage and support said article; means for lifting said supporting members at said first position to effect lifting of said article; means for transferring said carriage means along a path in a direction from said first position toward said second position and beyond; means for lowering said supporting members at said second position to an article support structure as said carriage means is transferred beyond said second position; means for raising said supporting members when the latter has been transferred beyond said second position; and means for returning said carriage means along said path to said first position.

5. Apparatus for transferring from a first position to a second position an article having a flange on opposite sides thereof, said apparatus comprising carriage means; at least a pair of relatively fixed, substantially parallel tines free at corresponding ends carried by said carriage means and spaced apart a distance to engage and support the flanges of said article; means for lifting said carriage means at said first position from a first level in which said tines are below the level of said flanges to another level in which said tines may engage said flanges and support said article; means for transferring said carriage means in a direction from said first position to and beyond said second position; means at said second position located between said tines for engaging said article and removing the latter from said tines as said carriage means is transferred in said direction beyond said second position; and means for returning said carriage means to said first position.

6. Apparatus for transferring from a first position to a second position an article having a flange on opposite sides thereof, said apparatus comprising carriage means; at least a pair of relatively fixed, substantially parallel tines free at corresponding ends carried by said carriage means and spaced apart a distance to engage and support the flanges of said article; means for lifting said carriage means at said first position from a first level in which said tines are below the level of said flanges to another level in which said tines may engage said flanges and support said article; means for lowering said carriage means at said second position; means for transferring said carriage means in a direction from said first position to and beyond said second position; means at said second position for supporting said article and removing the latter from said tines as said carriage means is transferred in said direction beyond said second position; and means for returning said carriage means to said first position.

7. Apparatus for transferring from a first position to a second position an article having a flange on opposite sides thereof, said apparatus comprising carriage means; at least a pair of relatively fixed, subtantially parallel tines free at corresponding ends carried by said carriage means and spaced apart a distance to engage and support the flanges of said article; means for lifting said carriage means at said first position from a first level in which said tines are below the level of said flanges to another level in which said tines may engage said flanges and support said article; means for lowering said carriage means at said second position; means for transferring said carriage means in a direction from said first position to and beyond said second position; means at said second position located between said tines for engaging said article and removing the latter from said tines as said carriage means is transferred in said direction beyond said second position; means for raising said carriage means when the latter has been transferred beyond said second position; and means for returning said carriage means to said first position.

8. Apparatus for transferring from a first position to a second position an article having a flange on opposite sides thereof, said apparatus comprising carriage means; at least a pair of relatively fixed, substantially parallel tines free at corresponding ends carried by said carriage means and spaced apart a distance to engage and support the flanges of said article; means for lifting said carriage means at said first position from a first level in which said tines are below the level of said flanges to another level in which said tines may engage said flanges and support said article; means for lowering said carriage means at said second position; means for transferring said carriage means in a direction from said first position to and beyond said second position; means at said second position located between said tines for engaging said article and removing the latter from said tines as said carriage means is transferred in said direction beyond said second position; means for raising said carriage means when the latter has been transferred beyond said second position; means for returning said carriage means to said first position; and means for lowering said carriage means between said second and first positions to locate said tines at said first level.

References Cited by the Examiner

UNITED STATES PATENTS

| | | | |
|---|---|---|---|
| 1,139,027 | 5/15 | George | 198—219 |
| 1,733,547 | 10/29 | Lorenz. | |
| 1,836,444 | 12/31 | Carnahan. | |
| 1,983,593 | 12/34 | Beeson et al. | 198—24 X |
| 2,001,332 | 5/35 | Ross | 198—24 X |
| 2,072,502 | 3/37 | Haub | 198—24 X |
| 2,077,830 | 4/37 | Failinger | 198—24 X |
| 2,094,497 | 9/37 | Ross | 198—24 X |
| 2,598,222 | 5/52 | Cahners et al. | |
| 2,611,493 | 9/52 | Nordquist. | |

SAMUEL F. COLEMAN, *Primary Examiner.*

WILLIAM B. LA BORDE, *Examiner.*